(12) United States Patent
Hung et al.

(10) Patent No.: US 8,680,835 B2
(45) Date of Patent: Mar. 25, 2014

(54) BUCK DC-TO-DC CONVERTER HAVING A NOVEL OUTPUT PROTECTION MECHANISM

(75) Inventors: Chia-Chieh Hung, Taipei (TW); Chung-Han Wu, Taipei (TW); Feng-Jung Huang, Taipei (TW)

(73) Assignee: Immense Advance Technology, Taipei (TW)

( * ) Notice: Subject to any disclaimer, the term of this patent is extended or adjusted under 35 U.S.C. 154(b) by 213 days.

(21) Appl. No.: 13/364,491

(22) Filed: Feb. 2, 2012

(65) Prior Publication Data

US 2013/0200863 A1 Aug. 8, 2013

(51) Int. Cl.
*G05F 1/00* (2006.01)
(52) U.S. Cl.
USPC .......................................... 323/285; 315/219
(58) Field of Classification Search
USPC ......... 323/222, 234, 271, 282, 283, 284, 285; 315/285, 291, 309
See application file for complete search history.

(56) References Cited

U.S. PATENT DOCUMENTS

| | | | |
|---|---|---|---|
| 8,456,096 B2* | 6/2013 | Kwok et al. | 315/219 |
| 2010/0148738 A1* | 6/2010 | Schiff | 323/282 |
| 2011/0148374 A1* | 6/2011 | Gizara | 323/282 |

* cited by examiner

*Primary Examiner* — Nguyen Tran
(74) *Attorney, Agent, or Firm* — The Weintraub Group, P.L.C.

(57) ABSTRACT

A buck DC-to-DC converter having a novel output protection mechanism, comprising: a buck converter circuit, having a line input end, a DC output end, a first feedback end, and a second feedback end; a voltage divider, having an input terminal and an output terminal, the input terminal being coupled to the DC output end of the buck converter circuit, and the output terminal coupled to the first feedback end of the buck converter circuit for providing a first feedback voltage; and an output current sensing resistor, having one end coupled to the DC output end of the buck converter circuit, and another end coupled to the second feedback end of the buck converter circuit for providing a second feedback voltage; wherein the buck converter circuit uses the first feedback voltage and the second feedback voltage to generate a protection signal.

7 Claims, 3 Drawing Sheets

BUCK DC-TO-DC CONVERTER HAVING A NOVEL OUTPUT PROTECTION MECHANISM

BACKGROUND OF THE INVENTION

1. Field of the Invention

The present invention relates to a buck DC-to-DC converter, and more particularly to a buck DC-to-DC converter having a novel output protection mechanism.

2. Description of the Related Art

Please refer to FIG. 1, which illustrates a prior art buck DC-to-DC converter. As illustrated in FIG. 1, the converter includes a buck converter circuit 100, a pair of voltage dividing resistors 160, 170, a first output current sensing resistor 1801, and a second output current sensing resistor 1802, wherein the buck converter circuit 100 includes a controller 110, a switch 120, a diode 130, an inductor 140, and a capacitor 150, and has an input end coupled to a line voltage $V_{LINE}$, and an output end for providing a DC output voltage $V_{DC}$.

The controller 110 uses a feedback voltage $V_{FB1}$ to generate a driving signal $V_G$, and uses feedback voltages $V_{FB2}$, $V_{FB3}$, $V_{FB4}$, and $V_{FB5}$ to generate a protection signal, wherein the protection signal will disable the driving signal $V_G$ to protect the buck converter circuit 100 when the difference between $V_{FB2}$ and $V_{FB3}$ exceeds a first predetermined value or the difference between $V_{FB4}$ and $V_{FB5}$ exceeds a second predetermined value, that is, when over-current occurs in the first output current sensing resistor 1801, or in the second output current sensing resistor 1802.

The switch 120, the diode 130, the inductor 140, and the capacitor 150 are used to form a buck circuit to convert the line voltage $V_{LINE}$ to the DC output voltage $V_{DC}$ under the control of the controller 110.

The voltage dividing resistors 160, 170 are used to form a voltage divider to divide the DC output voltage $V_{DC}$, and thereby generate the feedback voltage $V_{FB1}$.

The first output current sensing resistor 1801 and the second output current sensing resistor 1802 are used to sense a first output current $I_{O1}$ and a second output current $I_{O2}$ flowing out the output end of the buck converter circuit 100 respectively, wherein $I_{O1}=(V_{FB2}-V_{FB3})/$(the resistance of the resistor 1801), and $I_{O2}=(V_{FB4}-V_{FB5})/$(the resistance of the resistor 1802).

When in operation, the feedback voltage $V_{FB1}$ will be regulated at a reference voltage due to a negative feedback mechanism, and the DC output voltage $V_{DC}$ will thereby be generated; and when $I_{O1}$ exceeds a first predetermined value—causing the difference between $V_{FB2}$ and $V_{FB3}$ larger than a first threshold voltage, or $I_{O2}$ exceeds a second predetermined value—causing the difference between $V_{FB4}$ and $V_{FB5}$ larger than a second threshold voltage, the controller 110 will disable the driving signal $V_G$ to stop the power conversion process.

However, as the first output current $I_{O1}$ and the second output current $I_{O2}$ are represented by the voltage across the resistors 1801 and the voltage across the resistor 1802 respectively, additional pins have to be added in the controller 100 to attain over-current protection for the prior art buck DC-to-DC converter. Sometimes this can increase the package size of the controller 100 and thereby increase the cost.

In view of the foregoing problem, the present invention proposes a novel buck DC-to-DC converter, which is capable of using less feedback points to attain over-current protection.

SUMMARY OF THE INVENTION

The major objective of the present invention is to propose a buck DC-to-DC converter capable of using less tapping points to attain over-current protection in power applications having multiple outputs.

Another objective of the present invention is to propose a buck DC-to-DC converter of which a controller needs less external connection pins.

To achieve the foregoing objectives of the present invention, a buck DC-to-DC converter having a novel output protection mechanism is proposed, the buck DC-to-DC converter including:

a buck converter circuit, having a line input end, a DC output end, a first feedback end, and a second feedback end, the line input end being coupled to a line voltage;

a voltage divider, having an input terminal and an output terminal, the input terminal being coupled to the DC output end of the buck converter circuit, and the output terminal coupled to the first feedback end of the buck converter circuit for providing a first feedback voltage; and an output current sensing resistor, having one end coupled to the DC output end of the buck converter circuit, and another end coupled to the second feedback end of the buck converter circuit for providing a second feedback voltage;

wherein the buck converter circuit uses the first feedback voltage for regulating a DC output voltage at the DC output end of the buck converter circuit, and uses the first feedback voltage and the second feedback voltage to generate a protection signal for the buck converter circuit when the current flowing through the output current sensing resistor exceeds a predetermined value.

Preferably, the buck converter circuit comprises:

an amplifier, having a positive input end, a negative input end, and an output end, the positive input end being coupled to the first feedback end;

a first resistor, coupled between the second feedback end and the negative input end;

a second resistor, coupled between the negative input end and the output end; and a comparator, having a first input end coupled to the output end, a second input end coupled to a reference voltage, and a comparison output end for providing the protection signal, wherein the reference voltage is set according to the predetermined value.

To achieve the foregoing objectives of the present invention, another buck DC-to-DC converter having a novel output protection mechanism is proposed, the buck DC-to-DC converter including:

a buck converter circuit, having a line input end, a DC output end, a first feedback end, a second feedback end, and a third feedback end, the line input end being coupled to a line voltage;

a voltage divider, having an input terminal and an output terminal, the input terminal being coupled to the DC output end of the buck converter circuit, and the output terminal coupled to the first feedback end of the buck converter circuit for providing a first feedback voltage;

a first output current sensing resistor, having one end coupled to the DC output end of the buck converter circuit, and another end coupled to the second feedback end of the buck converter circuit for providing a second feedback voltage; and a second output current sensing resistor, having one end coupled to the DC output end of the buck converter circuit, and another end coupled to the third feedback end of the buck converter circuit for providing a third feedback voltage;

wherein the buck converter circuit uses the first feedback voltage for regulating a DC output voltage at the DC output end of the buck converter circuit, and uses the first feedback voltage, the second feedback voltage, and the third feedback voltage to generate a protection signal for the buck converter circuit when the current flowing through the first output current sensing resistor exceeds a first predetermined value or the current flowing through the second output current sensing resistor exceeds a second predetermined value.

Preferably, the buck converter circuit comprises:

a first amplifier, having a first positive input end, a first negative input end, and a first output end, the first positive input end being coupled to the first feedback end;

a first resistor, coupled between the second feedback end and the first negative input end;

a second resistor, coupled between the first negative input end and the first output end;

a first comparator, having a first input end coupled to the first output end, a second input end coupled to a first reference voltage, and a first comparison output end, wherein the first reference voltage is set according to the first predetermined value;

a second amplifier, having a second positive input end, a second negative input end, and a second output end, the second positive input end being coupled to the first feedback end;

a third resistor, coupled between the third feedback end and the second negative input end;

a fourth resistor, coupled between the second negative input end and the second output end;

a second comparator, having a third input end coupled to the second output end, a fourth input end coupled to a second reference voltage, and a second comparison output end, wherein the second reference voltage is set according to the second predetermined value; and an OR circuit, coupled to the first comparison output end and the second comparison output end for providing the protection signal.

To achieve the foregoing objectives of the present invention, still another buck DC-to-DC converter having a novel output protection mechanism is proposed, the buck DC-to-DC converter including:

a buck converter circuit, having a line input end, a DC output end, a first feedback end, and a plurality of second feedback ends, the line input end being coupled to a line voltage;

a voltage divider, having an input terminal and an output terminal, the input terminal being coupled to the DC output end of the buck converter circuit, and the output terminal coupled to the first feedback end of the buck converter circuit; and a plurality of output current sensing resistors, each of which having one end coupled to the DC output end of the buck converter circuit, and another end coupled to one of the second feedback ends of the buck converter circuit;

wherein the buck converter circuit uses the voltage at the first feedback end for regulating a DC output voltage at the DC output end of the buck converter circuit, and uses the voltage at the first feedback end and the voltages at the second feedback ends to generate a protection signal for the buck converter circuit when the current flowing through any one of the output current sensing resistors exceeds a corresponding predetermined value.

Preferably, the buck converter circuit comprises a plurality of over-current detection circuits, each of which having:

an amplifier, having a positive input end, a negative input end, and an output end, the positive input end being coupled to the first feedback end;

a first resistor, coupled between the second feedback end and the negative input end;

a second resistor, coupled between the negative input end and the output end; and a comparator, having a first input end coupled to the output end, a second input end coupled to a corresponding reference voltage, and a comparison output end, wherein the corresponding reference voltage is set according to the corresponding predetermined value.

Preferably, the buck converter circuit further comprises:

an OR circuit, coupled to a plurality of the comparison output ends for providing the protection signal.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
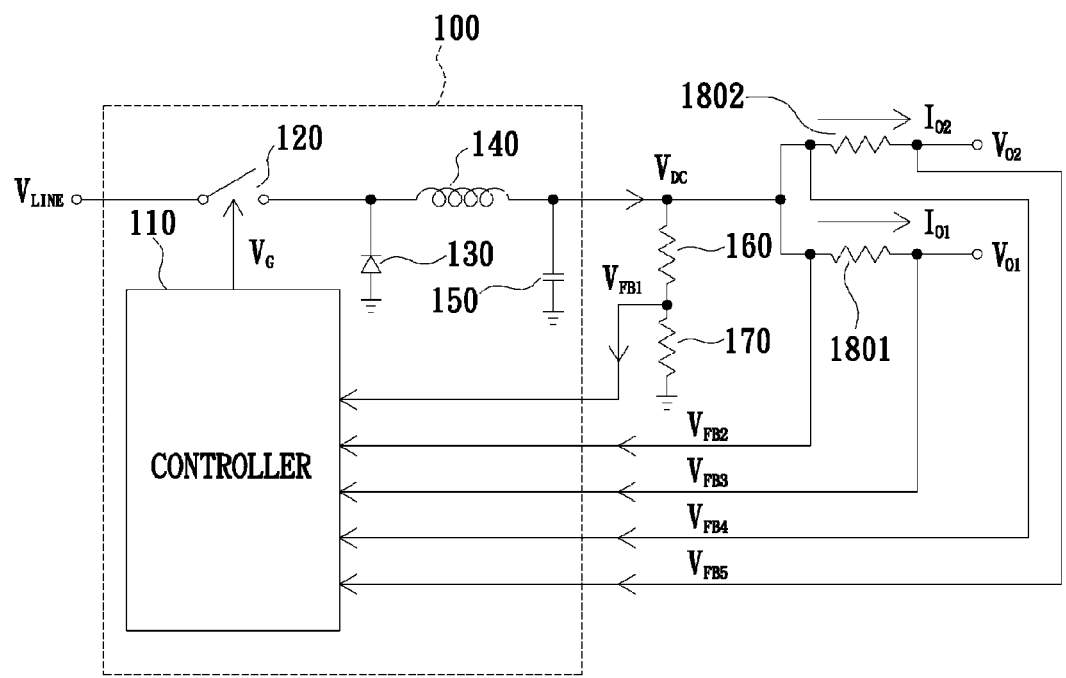
FIG. 1 illustrates a prior art buck DC-to-DC converter.
Figure 2:
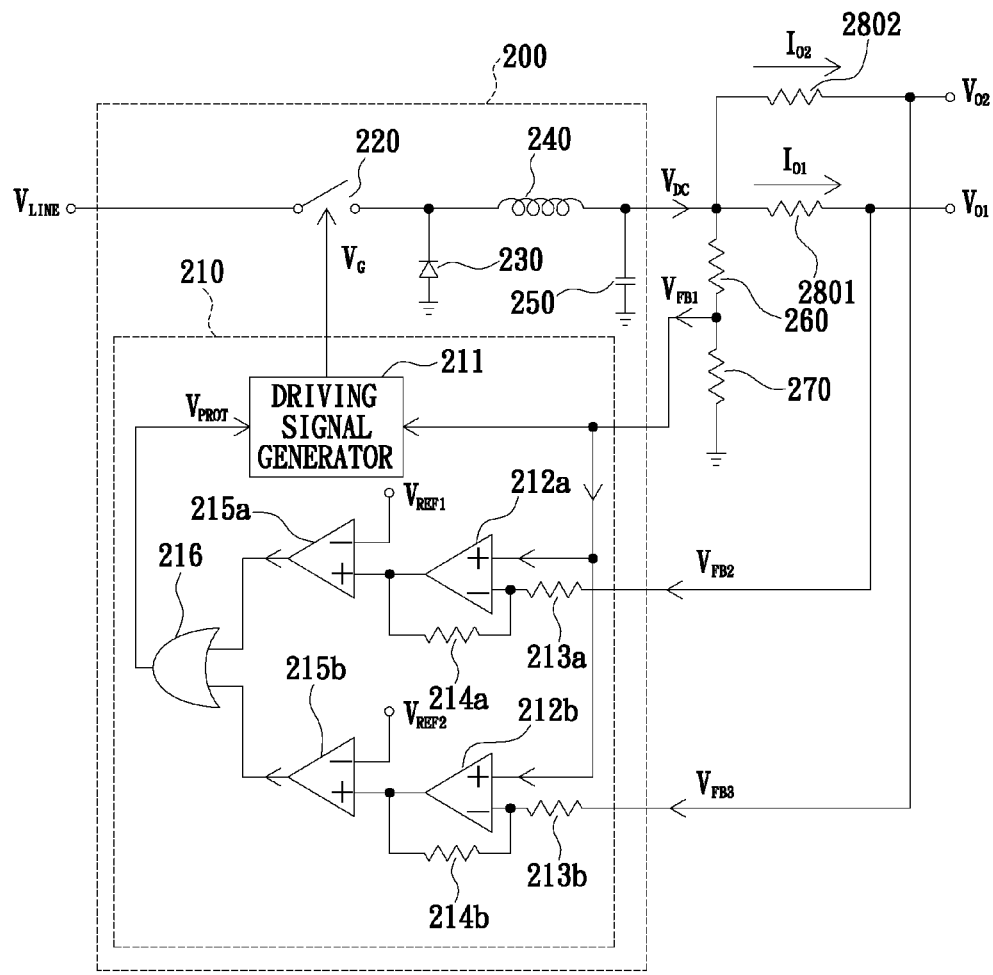
FIG. 2 illustrates a buck DC-to-DC converter having a novel output protection mechanism according to a preferred embodiment of the present invention.

Please refer to FIG. 2, which illustrates a buck DC-to-DC converter having a novel output protection mechanism according to a preferred embodiment of the present invention. As illustrated in FIG. 2, the converter includes a buck converter circuit 200, a first voltage dividing resistor 260, a second voltage dividing resistor 270, a first output current sensing resistor 2801, and a second output current sensing resistor 2802, wherein the buck converter circuit 200 includes a controller 210, a switch 220, a diode 230, an inductor 240, and a capacitor 250, and has an input end coupled to a line voltage $V_{LINE}$, an output end for providing a DC output voltage $V_{DC}$, a first feedback end coupled to a first feedback voltage $V_{FB1}$, a second feedback end coupled to a second feedback voltage $V_{FB2}$, and a third feedback end coupled to a third feedback voltage $V_{FB3}$.

The controller 210 uses the first feedback voltage $V_{FB1}$ to generate a driving signal $V_G$, and uses the second feedback voltage $V_{FB2}$, and the third feedback voltage $V_{FB3}$ to generate a protection signal $V_{PROT}$, wherein the protection signal $V_{PROT}$ will disable the driving signal $V_G$ to protect the buck converter circuit 200 when the current flowing through the first output current sensing resistor 2801 exceeds a first predetermined value, or the current flowing through the second output current sensing resistor 2802 exceeds a second predetermined value.

The controller 210 includes a driving signal generator 211, a first amplifier 212a, a first resistor 213a, a second resistor 214a, a first comparator 215a, a second amplifier 212b, a third resistor 213b, a fourth resistor 214b, a second comparator 215b, and an OR circuit 216.

The first amplifier 212a, the first resistor 213a, the second resistor 214a, and the first comparator 215a are used to form a first over-current detection circuit. The first amplifier 212a has a first positive input end, a first negative input end, and a first output end, with the first positive input end coupled to the first feedback end. The first resistor 213a is coupled between the second feedback end and the first negative input end; the second resistor 214a is coupled between the first negative input end and the first output end. The first comparator 215a has a first input end coupled to the first output end of the first amplifier 212a, a second input end coupled to a first reference voltage $V_{REF1}$, and a first comparison output end.

The resistance ratio of the second resistor 214a to the first resistor 213a is set equal to the resistance ratio of the second voltage dividing resistor 270 to the first voltage dividing resistor 260, so that the voltage at the first output end of the first amplifier 212a is proportional to $(V_{DC}-V_{FB2})$. The first reference voltage $V_{REF1}$ is set according to the first predetermined value so that, if $I_{O1}$ exceeds the first predetermined value, the voltage at the first output end of the first amplifier 212a will be higher than the first reference voltage $V_{REF1}$, and cause the first comparison output end of the first comparator 215a to exhibit a high level.

The second amplifier 212b, the third resistor 213b, the fourth resistor 214b, and the second comparator 215b are used to form a second over-current detection circuit. The second amplifier 212b has a second positive input end, a second negative input end, and a second output end, with the second positive input end coupled to the first feedback end. The third resistor 213b is coupled between the third feedback end and the second negative input end; the fourth resistor 214b is coupled between the second negative input end and the second output end. The second comparator 215b has a third input end coupled to the second output end of the second amplifier 212b, a fourth input end coupled to a second reference voltage $V_{REF2}$, and a second comparison output end.

The resistance ratio of the second resistor 214b to the first resistor 213b is set equal to the resistance ratio of the second voltage dividing resistor 270 to the first voltage dividing resistor 260, so that the voltage at the second output end of the second amplifier 212b is proportional to $(V_{DC}-V_{FB2})$. The second reference voltage $V_{REF2}$ is set according to the second predetermined value so that, if $I_{O2}$ exceeds the second predetermined value, the voltage at the second output end of the second amplifier 212b will be higher than the second reference voltage $V_{REF2}$, and cause the second comparison output end of the second comparator 215b to exhibit a high level.

The OR circuit 216 is coupled to the first comparison output end and the second comparison output end for providing the protection signal $V_{PROT}$.

The switch 220, the diode 230, the inductor 240, and the capacitor 250 are used to form a buck circuit to convert the line voltage $V_{LINE}$ to the DC output voltage $V_{DC}$ under the control of the controller 210.

The first voltage dividing resistor 260, and the second voltage dividing resistor 270 are used to form a voltage divider to divide the DC output voltage $V_{DC}$, and thereby generate the feedback voltage $V_{FB1}$.

The first output current sensing resistor 2801 and the second output current sensing resistor 2802 are used to sense a first output current $I_{O1}$ and a second output current $I_{O2}$ flowing out the output end of the buck converter circuit 200 respectively, wherein $I_{O1}=(V_{DC}-V_{FB2})/$(the resistance of the resistor 2801), and $I_{O2}=(V_{DC}-V_{FB3})/$(the resistance of the resistor 2802).

When in operation, the feedback voltage $V_{FB1}$ will be regulated at a reference voltage due to a negative feedback mechanism, and the DC output voltage $V_{DC}$ will thereby be generated; and when $I_{O1}$ exceeds the first predetermined value—causing the second comparison output end of the second comparator 215b to exhibit a high level, or $I_{O2}$ exceeds a second determined value—causing the first comparison output end of the first comparator 215a to exhibit a high level, the protection signal $V_{PROT}$ provided by the OR circuit 216 will be active to protect the buck DC-to-DC converter by, for example, shutting down the driving signal generator 211.

Figure 3:
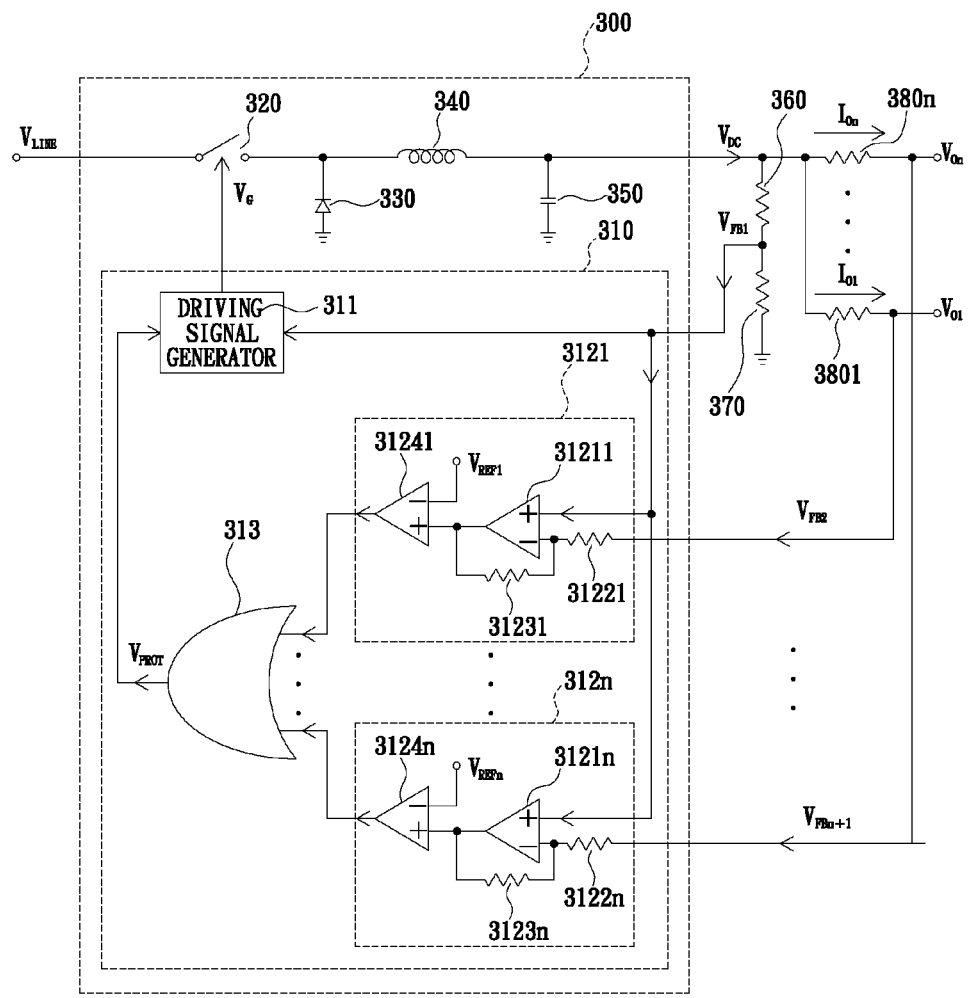
FIG. 3 illustrates another preferred embodiment of the present invention's buck DC-to-DC converter having a novel output protection mechanism.

FIG. 3 illustrates another preferred embodiment of the present invention's buck DC-to-DC converter having a novel output protection mechanism. As illustrated in FIG. 3, the converter includes a buck converter circuit 300, a first voltage dividing resistor 360, a second voltage dividing resistor 370, and a plurality of output current sensing resistors 3801-380n, wherein the buck converter circuit 300 includes a controller 310, a switch 320, a diode 330, an inductor 340, and a capacitor 350, and has an input end coupled to a line voltage $V_{LINE}$, an output end for providing a DC output voltage $V_{DC}$, a first feedback end coupled to a first feedback voltage $V_{FB1}$, and a plurality of second feedback ends coupled to a plurality of second feedback voltages $V_{FB2}$ through $V_{FBn+1}$.

The controller 310 uses the first feedback voltage $V_{FB1}$ to generate a driving signal $V_G$, and uses the second feedback voltages $V_{FB2}$ through $V_{FBn+1}$ to generate a protection signal $V_{PROT}$, wherein the protection signal $V_{PROT}$ will disable the driving signal $V_G$ to protect the buck converter circuit 300 when the current flowing through any of the output current sensing resistors 3801-380n exceeds a corresponding predetermined value.

The controller 310 includes a driving signal generator 311, a plurality of over-current detection circuits 3121-312n, and an OR circuit 313, wherein the configuration of each of the over-current detection circuits 3121-312n is same as the counterpart in FIG. 2. As the principle of each of the over-current detection circuits 3121-312n is disclosed above, it will not be reiterated here.

The OR circuit 313 is coupled to the output ends of the over-current detection circuits 3121-312n for providing the protection signal $V_{PROT}$.

The switch 320, the diode 330, the inductor 340, and the capacitor 350 are used to form a buck circuit to convert the line voltage $V_{LINE}$ to the DC output voltage $V_{DC}$ under the control of the controller 310.

The first voltage dividing resistor 360 and the second voltage dividing resistor 370 are used to form a voltage divider to divide the DC output voltage $V_{DC}$, and thereby generate the first feedback voltage $V_{FB1}$.

The output current sensing resistors 3801-380n are used to sense output currents $I_{O1}$ through $I_{On}$ respectively, wherein $I_{Ok}=(V_{DC}-V_{FBk+1})/$(the resistance of the resistor 380k), with k=1 through n.

When in operation, the first feedback voltage $V_{FB1}$ will be regulated at a reference voltage due to a negative feedback mechanism, and the DC output voltage $V_{DC}$ will thereby be generated; and when any of $I_{O1}$ through $I_{On}$ exceeds the corresponding predetermined value, the protection signal $V_{PROT}$ provided by the OR circuit 313 will be active to protect the buck DC-to-DC converter by, for example, shutting down the driving signal generator 311.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A buck DC-to-DC converter having a novel output protection mechanism, comprising:
   a buck converter circuit, having a line input end, a DC output end, a first feedback end, and a second feedback end, said line input end being coupled to a line voltage;
   a voltage divider, having an input terminal and an output terminal, said input terminal being coupled to said DC output end of said buck converter circuit, and said output terminal coupled to said first feedback end of said buck converter circuit for providing a first feedback voltage; and
   an output current sensing resistor, having one end coupled to said DC output end of said buck converter circuit, and another end coupled to said second feedback end of said buck converter circuit for providing a second feedback voltage;
   wherein said buck converter circuit uses said first feedback voltage for regulating a DC output voltage at said DC output end of said buck converter circuit, and uses said first feedback voltage and said second feedback voltage to generate a protection signal for said buck converter circuit when the current flowing through said output current sensing resistor exceeds a predetermined value.

2. The buck DC-to-DC converter having a novel output protection mechanism as claim 1, wherein said buck converter circuit comprises:
   an amplifier, having a positive input end, a negative input end, and an output end, said positive input end being coupled to said first feedback end;
   a first resistor, coupled between said second feedback end and said negative input end;
   a second resistor, coupled between said negative input end and said output end; and
   a comparator, having a first input end coupled to said output end, a second input end coupled to a reference voltage, and a comparison output end for providing said protection signal, wherein said reference voltage is set according to said predetermined value.

3. A buck DC-to-DC converter having a novel output protection mechanism, comprising:
   a buck converter circuit, having a line input end, a DC output end, a first feedback end, a second feedback end, and a third feedback end, said line input end being coupled to a line voltage;
   a voltage divider, having an input terminal and an output terminal, said input terminal being coupled to said DC output end of said buck converter circuit, and said output terminal coupled to said first feedback end of said buck converter circuit for providing a first feedback voltage;
   a first output current sensing resistor, having one end coupled to said DC output end of said buck converter circuit, and another end coupled to said second feedback end of said buck converter circuit for providing a second feedback voltage; and
   a second output current sensing resistor, having one end coupled to said DC output end of said buck converter circuit, and another end coupled to said third feedback end of said buck converter circuit for providing a third feedback voltage;
   wherein said buck converter circuit uses said first feedback voltage for regulating a DC output voltage at said DC output end of said buck converter circuit, and uses said first feedback voltage, said second feedback voltage, and said third feedback voltage to generate a protection signal for said buck converter circuit when the current flowing through said first output current sensing resistor exceeds a first predetermined value or the current flowing through said second output current sensing resistor exceeds a second predetermined value.

4. The buck DC-to-DC converter having a novel output protection mechanism as claim 3, wherein said buck converter circuit comprises:
   a first amplifier, having a first positive input end, a first negative input end, and a first output end, said first positive input end being coupled to said first feedback end;
   a first resistor, coupled between said second feedback end and said first negative input end;
   a second resistor, coupled between said first negative input end and said first output end;
   a first comparator, having a first input end coupled to said first output end, a second input end coupled to a first reference voltage, and a first comparison output end, wherein said first reference voltage is set according to said first predetermined value;
   a second amplifier, having a second positive input end, a second negative input end, and a second output end, said second positive input end being coupled to said first feedback end;
   a third resistor, coupled between said third feedback end and said second negative input end;
   a fourth resistor, coupled between said second negative input end and said second output end;
   a second comparator, having a third input end coupled to said second output end, a fourth input end coupled to a second reference voltage, and a second comparison output end, wherein said second reference voltage is set according to said second predetermined value; and
   an OR circuit, coupled to said first comparison output end and said second comparison output end for providing said protection signal.

5. A buck DC-to-DC converter having a novel output protection mechanism, comprising:
   a buck converter circuit, having a line input end, a DC output end, a first feedback end, and a plurality of second feedback ends, said line input end being coupled to a line voltage;
   a voltage divider, having an input terminal and an output terminal, said input terminal being coupled to said DC output end of said buck converter circuit, and said output terminal coupled to said first feedback end of said buck converter circuit; and
   a plurality of output current sensing resistors, each of which having one end coupled to said DC output end of said buck converter circuit, and another end coupled to one of said second feedback ends of said buck converter circuit;
   wherein said buck converter circuit uses the voltage at said first feedback end for regulating a DC output voltage at said DC output end of said buck converter circuit, and uses the voltage at said first feedback end and the voltages at said second feedback ends to generate a protection signal for said buck converter circuit when the current flowing through any one of said output current sensing resistors exceeds a corresponding predetermined value.

6. The buck DC-to-DC converter having a novel output protection mechanism as claim 5, wherein said buck converter circuit comprises a plurality of over-current detection circuits, each of which having:
   an amplifier, having a positive input end, a negative input end, and an output end, said positive input end being coupled to said first feedback end;
   a first resistor, coupled between said second feedback end and said negative input end;
   a second resistor, coupled between said negative input end and said output end; and
   a comparator, having a first input end coupled to said output end, a second input end coupled to a corresponding reference voltage, and a comparison output end, wherein said corresponding reference voltage is set according to said corresponding predetermined value.

7. The buck DC-to-DC converter having a novel output protection mechanism as claim 6, wherein said buck converter circuit further comprises:
   an OR circuit, coupled to a plurality of said comparison output ends for providing said protection signal.

* * * * *